United States Patent [19]

Yeschick

[11] 4,119,953
[45] Oct. 10, 1978

[54] TIMESHARING PROGRAMMABLE DISPLAY SYSTEM

[75] Inventor: Waldemar Yeschick, Ilion, N.Y.

[73] Assignee: Mohawk Data Sciences Corp., Herkimer, N.Y.

[21] Appl. No.: 761,849

[22] Filed: Jan. 24, 1977

[51] Int. Cl.² .............................................. G06F 3/14
[52] U.S. Cl. ......................... 340/324 AD; 340/152 R
[58] Field of Search ........... 340/324 A, 324 AD, 152, 340/154

[56] References Cited

U.S. PATENT DOCUMENTS

| | | | |
|---|---|---|---|
| 3,500,327 | 3/1970 | Belcher et al. | 340/324 AD |
| 3,505,665 | 4/1970 | Lasoff et al. | 340/324 A |
| 3,623,069 | 11/1971 | Malden | 340/324 AD |
| 3,641,558 | 2/1972 | Cook et al. | 340/324 AD |
| 3,641,559 | 2/1972 | Hogan et al. | 340/324 AD |

*Primary Examiner*—Marshall M. Curtis
*Attorney, Agent, or Firm*—Robert R. Hubbard

[57] ABSTRACT

Electronic display system in which a single memory is timeshared by a plurality of display units each including a cathode ray tube (CRT) television monitor capable of displaying a frame of characters in the form of one or more lines as well as a central processing unit and a number of input/output units. Character codes representing the characters in each character line being displayed are stored in blocks of storage locations in the memory, one character line per memory block. A plurality of frame display programs, one for each display element, are stored in separate blocks of storage locations. Each program specifies the order in which the character lines are to be displayed by its corresponding display element. A refresh control unit common to all of the display units includes a basic line counting means which is employed to sequentially execute the frame display programs in retrieving the character codes from the memory and loading them into unit line buffers for the various display units. The basic line counting means is a part of an overall timing arrangement which controls the horizontal and vertical timing for each of the display elements such that the frame display cycles of the various elements are offset from one another by a sufficient amount of time to allow the aforementioned execution of the frame display programs.

8 Claims, 12 Drawing Figures

TIMESHARING PROGRAMMABLE DISPLAY SYSTEM

BACKGROUND OF INVENTION

1. Field of Invention

This invention relates to novel and improved electronic display systems, particularly those employing a plurality of display elements which are capable of exhibiting a television-type scanning raster. Included in this class of display elements is the familiar cathode-ray tube (CRT) as well as some forms of plasma displays.

Electronic display systems embodying the present invention may be used in a variety of applications. For example, an electronic display system may be used in a non-interactive application such as for the visual display of arrival and/or departure information in a transportation terminal. On the other hand, an electronic display system may be used in an operator interactive environment where an input device, typically a keyboard, is used by the operator to perform a host of operations such as editing, composing or retrieving textual material and the like. Specific applications include traditional key entry routines (the familiar keypunch, key-to-tape and key-to-disk operations) as well as more versatile source data capture operations where user oriented programs and/or programming languages allow the operator to record data records of the effects of a business transaction in real time and manipulate or process such data records.

2. Prior Art

In general, a television-type scanning raster is produced in a CRT by scanning the electron beam horizontally across the display surface to form a number of rather closely spaced and substantially horizontal scan lines. In this scanning process the beam is normally blanked and is selectively unblanked to achieve visual display of information. For the display of textual material, the character lines are generally defined by groups of scan lines with each group being defined by a sequence of scan line signals. Selective unblanking of the beam is achieved in synchronism with a number of sequences of dot signals which are generated during each scan line, the dot signal sequences defining the character spaces as well as their horizontal position on the display surface. The characters to be displayed may, for example, comprise alphanumeric symbols or other marks. Portions of each scan line in a character row or line group in the raster are selectively blanked and unblanked so that the scanning beam produces a slice of each character in a character line as the scanning beam forms a scan line across the CRT surface. The character slices in a character line group of scan lines then integrally form a complete row of characters.

Each character is represented in the electronic display system by a group of binary signals usually referred to as a character code. To generate the correct video signals at the proper time, selected ones of the character codes are shifted in sequence to a prescribed position during each scan line. In the prescribed position, the character codes are combined with the appropriate television scan line signals and dot signals thereby producing unblank signals at the proper time to provide slices of the corresponding character. Sequencing of the character codes causes the correct video signal to be applied to the CRT at the proper times in the scan lines.

Because the CRT display surface retains its illumination only for short periods of time, on the order of 20 milliseconds, the process of sequencing character codes and combining them with the dot signals must be repeated on the order of 40 to 70 times a second so as to present a nonflickering display. This repetitive process is sometimes called the refresh process.

Some prior art multiple CRT electronic display systems have used a separate refresh memory for each CRT to store a frame of character codes in the order that the corresponding characters are to be displayed on the CRT. The codes in each separate memory are read out in sequence at the appropriate times during the corresponding scan lines. The disadvantage of this type of system is the necessity for separate addressing and read-write controls for each memory.

In other electronic display systems, typified by U.S. Pat. No. 3,848,232, a single memory and a line buffer register are employed in conjunction with a single CRT. In this system strings of character codes are stored in the memory together with a display program. The commands or instructions of the program designate the order as well as the various programming attributes in which the strings of characters are to be displayed in the CRT. Prior to the scan of a character line on the CRT screen the line buffer is filled with one or more strings of characters under control of the display program. The program contains not only the vertical position (i.e., character lines) but also the horizontal position within a character line of a string of characters and various other programming attribute information, all of which complicate the program and result in the use of extra memory cycles.

BRIEF SUMMARY OF THE INVENTION

In brief, the invention is embodied in display apparatus for N display units, where N is an integer greater than one. Each unit includes a television monitor responsive to a television signal to display a frame of characters in the form of one or more lines of characters. The television signal is characterized by a periodic television raster defined by raster timing signals produced by a source of timing signals and by the raster being adapted for encoding with a frame of character codes manifesting the frame of characters. Each unit further includes a unit buffer for storing the the frame of character codes, a line at a time, means for reading the codes from the buffer and means for combining the raster timing signals with the codes so read to produce the television signal. In accordance with the invention, the display apparatus is characterized by a memory which stores for each display unit a frame of character codes and a frame display program. The frame of character codes is in the form of a number of blocks of codes, the codes in each block representing a line of characters to be displayed by the corresponding display unit. Each frame display program has a number of instructions specifying the order in which the associated memory blocks are to be retrieved for display by the corresponding display unit. An instruction execution means is responsive to the raster timing signals to execute at least N instructions sequentially during M consecutive time periods for each television raster, where M is an integer. The N instructions include at least one instruction of each frame display program such that all programs are executed during each television rasterto retrieve N frames of codes from the memory and to load them in the corresponding unit line buffers.

BRIEF DESCRIPTION OF THE DRAWINGS

In the accompanying drawings like reference characters denote like elements of structure.

DESCRIPTION OF PREFERRED EMBODIMENT

General Description of System

Display control apparatus embodying the present invention may be employed in any suitable display system in which it is desired to display symbolic information on a plurality of display terminals. However, by way of example and completeness of description, the display control apparatus of the present invention will be presented herein as embodied in a multiple display system having the general architectural arrangement illustrated in FIG. 1. The FIG. 1 display system includes a central processing unit (CPU) and CRT refresh control 100 which is arranged to control the timesharing of a single memory 30 by a number of display monitors 400, 500 600 and 700, as well as by a number of magnetic disk storage devices 41 and 42 and other input/output (I/O) units 43. The system further includes a dual station controller 200 as an interface to display monitors 400 and 500 and a further dual station controller 300 as an interface to keyboard and CRT display monitors 600 and 700.

Figure 1:
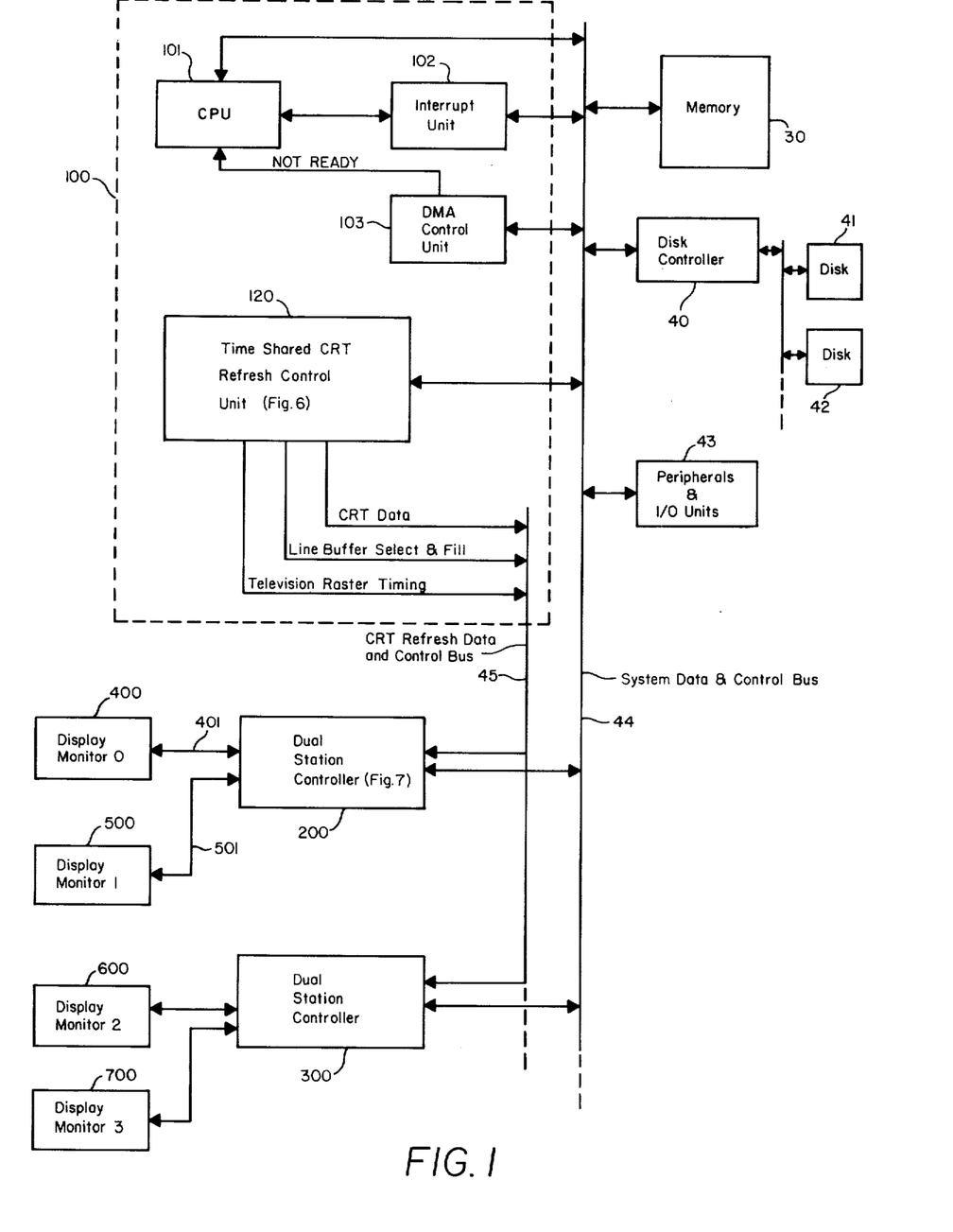
FIG. 1 is a block diagram of display apparatus embodying the present invention.

The CPU and refresh control 100 accomplishes timesharing control by means of two multi-lead busses which are each illustrated throughout the drawing by a single line in order to avoid clutter. The system data and control bus 44 includes a number of data leads and a number of control leads including memory address leads which convey control signals between the various units in controlling the transfer of data over the data leads therebetween. The CRT refresh data and control bus 45 includes a number of CRT data leads and a number of control leads to control or steer CRT refresh data from the CPU and CRT refresh control 100 to the proper dual station controller 200 or 300 at the proper times.

Magnetic disk units 41 and 42 communicate with the system data and control bus 44 via a disk controller 40. The magnetic disk units serve to provide additional backup storage for memory 30. The dashed connection from the disk controller 40 to the disk units 41 and 42 indicates that additional disk units can be connected thereto.

The display system can also accommodate a number of peripherals and/or I/O units as indicated at 43. Included in this category, for example, are printers, magnetic tape drives, communications links to remote sites and the like.

Each display monitor includes a keyboard and CRT television monitor not shown on the drawing). Data in the form of alphanumeric characters or other marks is displayed on the CRT surface as a frame of characters organized into character rows or lines. Each CRT electron beam is deflected in accordance with a television scanning raster on a periodic basis in order to present a non-flickering display, generally 40 to 70 times per second, for typical CRT's. The video signal containing the periodic television scanning raster is received over a coaxial cable from the associated dual station controller. That is, the video signals to display monitors 400 and 500 are provided by dual station controller 200 over coaxial cables 401 and 501, respectively.

Each dual station controller includes two line buffer registers and two television line counters, two video character generators (shown only in FIG. 7), one each for each of its associated display monitors. Each line buffer register is adapted to store the character codes representing an entire line of characters in a display frame. Each video character generator is responsive to its associated television line counter and to horizontal timing signals received from the bus 45 to generate the television scanning raster signal encoded by the contents of the corresponding line buffer register.

The memory 30 is a random access memory which has a number of storage locations, each defined by a unique memory address. The memory 30 performs a memory write operation in response to a first value of a memory read/write signal and a memory address on the bus 44 to write data (also provided on the bus 44) in the storage location defined by the address. On the other hand, the memory responds to a second value of the memory to read/write signal to read data from the storage location defined by the memory address and to provide such data on the bus 44. Upon completion of either a read or a write operation the memory 30 is further adapted to provide to the bus 44 a memory cycle done (MCD) signal. Stored in the memory 30 is an overall system display program for a particular application, for example, key entry or source data capture. Also stored in memory 30 for each display unit is a frame of character codes corresponding to the frame of characters currently being displayed together with an associated frame display program which defines the order in which the characters appear in the displayed frame.

The CPU and refresh controller 100 includes a CPU 101 for executing the display system program. In the course of executing the program, the CPU is also arranged to perform various operations upon request by the keyboard units 400, 500, 600 and 700 as well as the disk controller 40 and I/O units 43. The priority of such requests is established by an interrupt unit 102. For instance, when the operator of a keyboard unit, say unit 400, is keying in a data character, the dual station controller 200 places an interrupt signal, known as Keyboard Data Available on the system bus 44. The interrupt unit 102 responds to this interrupt signal on a rather high priority basis to interrupt the current operation of the CPU (provided that such current operation does not have a higher priority than Keyboard Data Available). The CPU then processes the incoming keyboard data as directed by the keyboard operator and/or the system display program. The CPU 101 in performing its various processing operations has the capability of generating the memory read/write signal and memory addresses as well as providing data to or receiving data from system bus 44.

The CPU and refresh control 100 further includes a timeshared CRT refresh control unit 120 for generally executing the frame display programs so as to provide CRT refresh data to the dual station controllers at the appropriate times together with television raster timing and other control information, all via the CRT refresh data and control bus 45. To perform these operations the refresh control unit 120 includes the ability (separate from the CPU 101) to generate memory addresses and memory read signals as well as the further ability to generate master television raster timing for all of the display units and the control signals necessary to load the CRT data accessed from the memory 30 into the appropriate line buffer registers in the dual station controllers 200 and 300.

As mentioned previously, both CPU 101 and refresh control unit 120 have the ability to access the memory 30. In addition, though not relevant to a discussion of the present invention, the disk controller 40 and various ones of the I/O units 43 also have the same ability. However, control of the memory can be had by only one such unit at any one time. Control as to the selection and priority of users is provided by a direct memory access (DMA) control unit 103 which is included in the CPU and refresh control 100. When a unit needs access to the memory 30, such unit generates a DMA request. The DMA control unit 103 includes a DMA request hold register, a priority encoder and an acknowledge decoder (none of which are shown in the drawings). DMA requests from the various units are entered into the DMA request hold register. The priority encoder establishes the priority of such requests and sends the encoded priority to the acknowledge decoder as well as raising a flag indicating a request is present. If the CPU 101 is not currently using the system bus, a NOT READY signal is presented to the CPU 101. Otherwise, the NOT READY signal will be presented as soon as CPU 101 is finished. Once the NOT READY flag signal is presented, an acknowledge flag is enabled for the highest priority DMA requesting unit and sent to such unit via the bus 44. This acknowledge flag remains active until a memory cycle done signal occurs which terminates the operation and allows new DMA requests to be entered into the DMA hold register.

Figure 2:
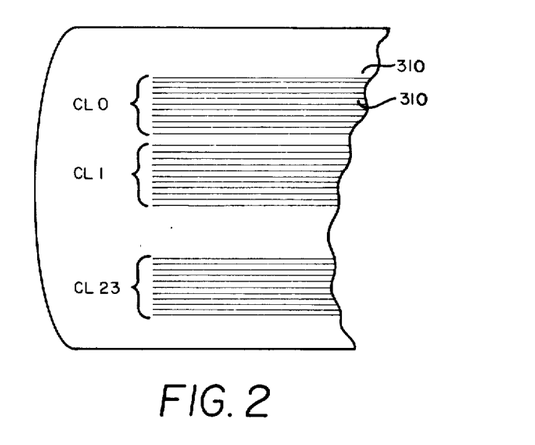
FIG. 2 is an elevation view showing a portion of a CRT screen and the arrangement of a television raster scan line configuration.

With reference now to FIG. 2 there is shown a portion of a CRT screen having depicted thereon a number of character rows or lines of which lines CL0, CL1 and CL 23 of a 24 character line display frame are illustrated. The 24 character line display frame is used herein for purposes of illustration only, display frames containing any desired number M of lines obviously being within the contemplation of the present invention. Each character line contains a number P of closely spaced TV scan lines 310. For the illustrated system design, there are 11 such scan lines per character line of which only nine are used in the display of a character, the unused scan lines being the two most bottom scan lines in the character row. It is well known in the television display art, that scan lines are produced by successive horizontal sweeps of the CRT electron beam from left to right (as viewed by and observer facing the CRT screen) with the beam being returned after each such sweep to the left (horizontal retrace) by a horizontal drive pulse and offset vertically downward to the level of the next consecutive scan line. In the illustrated design, 26 sequences of scan line signals are generated during each display frame. The first 24 sequences define the 24 character lines and the last two are allocated to vertical flyback (see FIG. 10).

The space between the character lines CL0 and CL1 is produced by a well known technique called skip-scan which essentially allows a single horizontal drive pulse to skip one or more scan line positions in returning the beam to the left side of the screen. When the beam has completed the bottom most sweep or scan line in the bottommost character line CL23, it is returned to the CRT screen by means of a vertical drive pulse (vertical flyback). During vertical flyback two or more horizontal drive pulses may occur so as to cause the beam to more or less slew back and forth across the screen skipping large numbers of scan lines for each horizontal drive pulse.

In the illustrated design during each scan line, 101 sequences of dot pulses are generated of which 80 are used to define 80 character spaces, the remainder of which are used for horizontal retrace. Each dot sequence includes nine dot pulses of which seven are used in the generation of a character and two are used for intercharacter spacing. That is, the characters are formed by means of a seven dot by nine scan line character matrix space.

Memory Organization and Display Programs

One of the more advantageous features of the present invention is the organization or allocation of storage within memory 30 which allows blocks of character codes representing entire character lines of the various display frames to be located anywhere within a defined area of the memory. The area is illustrated as the portions 31 and 32 in FIG. 3, which portions can be located anywhere in memory but are shown as the bottommost and uppermost portions for the sake of convenience. Each memory block is composed of at least 80 storage locations (one for each character in a line) having consecutive memory addresses. Character codes are stored in the memory block, one for each storage location, in the order in which the corresponding characters appear in the display frame character line.

Figure 3:
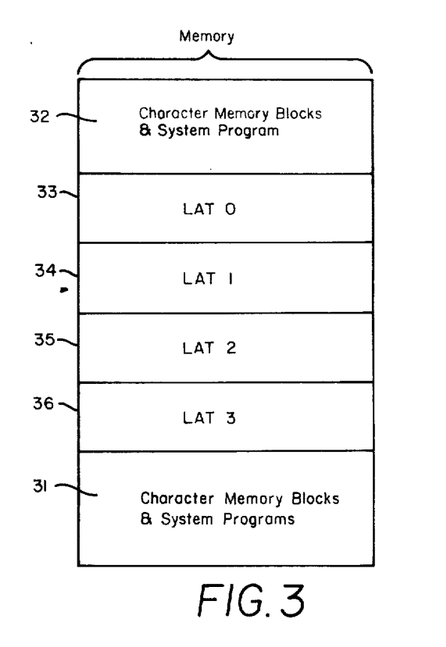
FIG. 3 is a block representation memory organization used in display apparatus embodying the invention.

The portions 31 and 32 of the memory also contain the system display program which controls operation of the CPU 101 (FIG. 1) and undedicated storage locations for the general use of the CPU.

Figure 4:
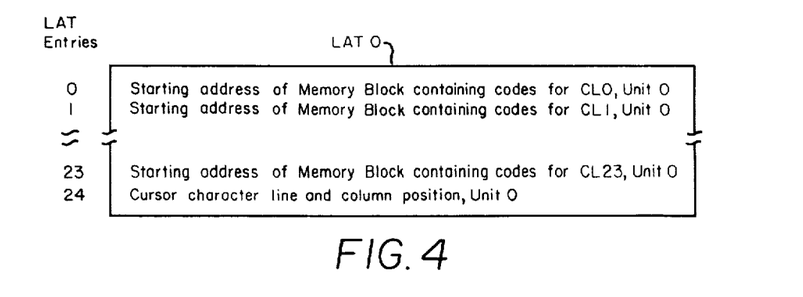
FIG. 4 is a further block representation of the organization within the memory of a display program used in display apparatus embodying the invention.

Portions 33, 34, 35 and 36 of memory 30 contain frame display programs LAT0, LAT1, LAT2, and LAT3 for the display frames being displayed by display monitors 400, 500, 600 and 700, respectively. These display monitors and their corresponding elements of structure (including the corresponding elements within the dual station controllers) and display frame program will be frequently referred to hereinafter as unit 0, unit 1, unit 2 and unit 3. Each frame display program defines the starting address of each memory block or character line block in its corresponding display frame as well as the order in which the so defined character lines are to appear in the display frame. This is accomplished rather simply by restricting the instructions or commands contained in the frame display program to the form of a look up table, herein called a line address table (LAT) and structuring consecutive entries in the table to correspond to the starting address of consecutive character line memory blocks for the corresponding display frame. This type of structuring is illustrated in FIG. 4 for LAT0 wherein the first 24 LAT entries, designated 0 through 23, contain the starting addresses of the memory blocks containing codes for lines CL0 through CL23, respectively, for unit 0. The 25th LAT entry, designated 24, contains the cursor character line and column position information for unit 0. Each frame display program is executed by simply reading the LAT entries in sequence one at a time. As each entry is read, it is used to address the corresponding memory block. All of the character codes contained in the memory block are read and then the next LAT entry in sequence may be fetched. The cursor entry is used to control the display of a cursor marker on the CRT screen. The cursor is generally a visible marker used by the operator to signify the character space that the current keying operation will affect.

In accordance with the timesharing aspect of the present invention, the frame display programs LAT0, LAT1, LAT2 and LAT3 are executed sequentially, one LAT entry at a time (plus the corresponding cursor entry), during the scanning of each character line. That is, during the scanning of character line CL0, refresh control unit 120 is operative to first execute entries 0 and 24 of LAT 0 followed in sequential order by entries 0 and 24 of LAT 1, LAT2 and LAT3. During the scanning of character line CL1, the refresh control unit first executes entries 1 and 24 of LAT0 followed by entries 1 and 24 of LAT1, LAT2, and LAT3 and so on.

Accordingly, for N display units at least N instructions (one from each LAT) are executed during each of M time periods for each television raster or frame, when M is the number of character lines in a frame and the time period is the time required for the television raster to scan a character line. During each such time period, the N instructions are executed during N sequentially occurring time slots, where each time slot (for the illustrated design) is equivalent to two scan lines.

Figure 5:
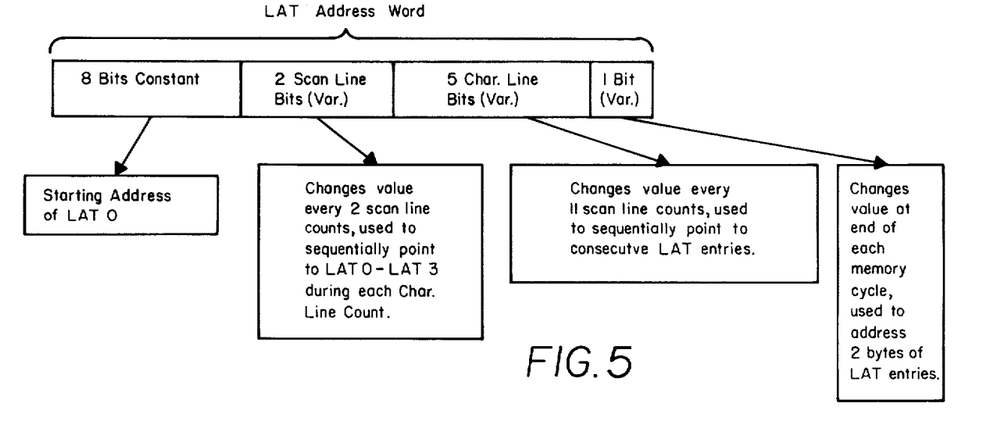
FIG. 5 is a further block representation of a command or instruction entry within the display program of FIG. 3.

The foregoing mode of operation is achieved rather simply by the advantageous use of a master or basic character and scan line counter included in the refresh control unit which counter is ordinarily used for controlling generation of the television raster. As illustrated in FIG. 5, 7 bits of the line counter output are used in conjunction with 9 other bits to form a 16 bit LAT address word. The 8 most significant bits are constant and define the starting address of LAT0. The next two most significant bits are two of the scan line bits which change value every two scan lines. These two bits are used to sequentially point to LAT0, LAT1, LAT2, and LAT3 during the scanning of each character line. The next five most significant bits are five character line bits which change value once every character line for 11 scan line count values. This field of 5 bits is used to sequentially point to consecutive LAT entries from 0 to 23. The least significant bit changes or toggles at the end of each memory cycle. This bit is used to address two bytes of LAT entry. That is, each LAT entry contains 16 bits in the form of 2 bytes of 8 bits each at consecutive memory addresses.

In summary, the basic line counter controls the sequential execution of the frame display programs. At the start of a display frame the counter character line count value indicates the first character line CL0. During the first time slot (scan lines 0 and 1) for CL0, the two scan line bits are used to select LAT0. The five character line bits point to entry 0 in LAT0 which is the starting address for the memory block which contains the codes for character line CL0 of display unit 0. The refresh control unit then acts to fetch entries 0 and 24 from LAT0, to read the memory codes in the memory block for line CL0 of unit 0 and to fill the line buffer for unit 0 with the codes so read. During the next time slot (scan lines 2 and 3) for character line CL0, the two scan line bits point to LAT1 and the five character line bits point to entry 0 in LAT1. The refresh control unit then acts similarly to execute the instruction entries in LAT1 for display in unit 1. During the next time slot (scan lines 4 and 5) LAT2 is addressed and the refresh control unit executes the instructions at entries 0 and 24 thereof. During the next time slot (scan lines 6 and 7), LAT3 is addressed and the instructions at entries 0 and 24 are executed. When 11 scan line counts have occurred, the five character line bits will change value to indicate character line CL1. The frame display programs LAT0, 1, 2 and 3 will again be sequentially executed for entries 1 and 24. This procedure then continues through character line CL23 and is then started over again as the refresh process continues.

Refresh Control Unit

Figure 6:
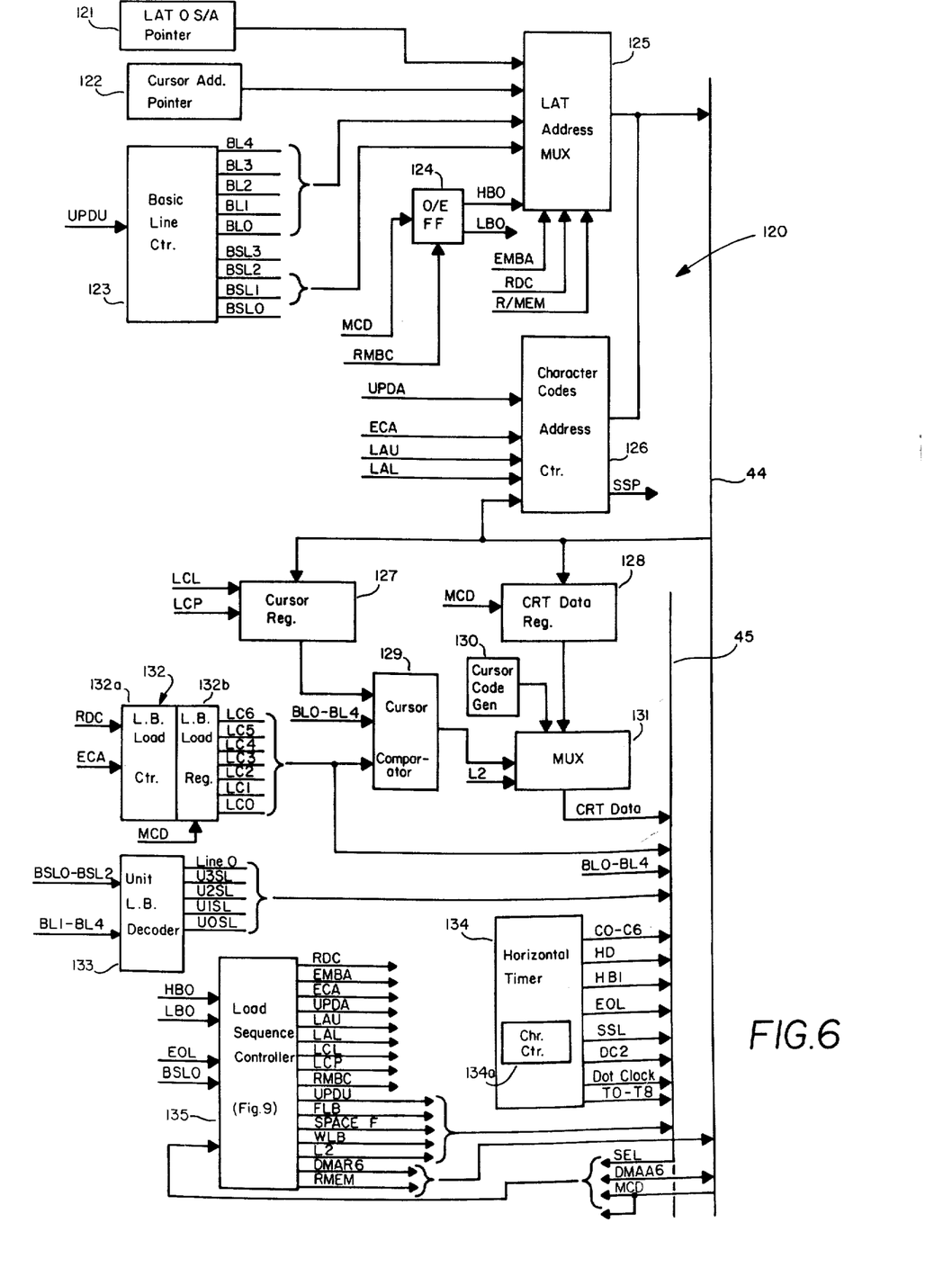
FIG. 6 is a block diagram of the timeshared CRT refresh control unit of FIG. 5.
Figure 11:
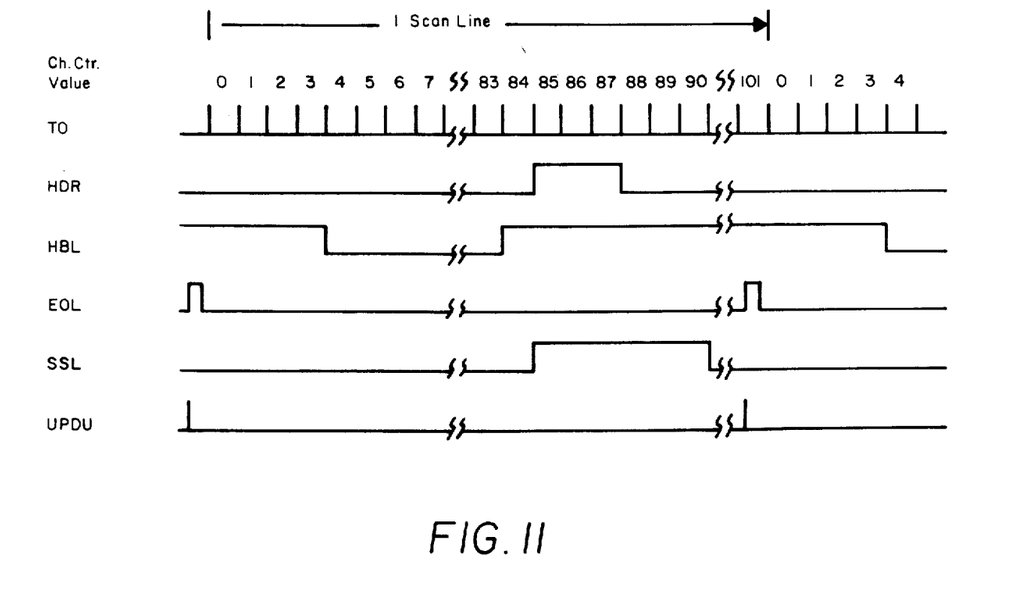
FIG. 11 is a timing diagram illustrating various horizontal timing signals generated by the horizontal timer in FIG. 6.

The basic line counter is designated as 123 in FIG. 6 which shows the refresh control unit 120 in more detail. The basic line counter 123 together with a horizontal timer 134 provide the essential timing control for the execution of the frame display programs in retrieving the character codes from the memory 30 as well as the filling or loading of the line buffers for the various display units with the character codes so retrieved. The horizontal timer 134 essentially generates a set of horizontal timing signals including a dot frequency signal which is divided into a number of sequences of nine dot signals T0–T8. The dot sequences are counted (for example, the T0 pulses are counted) by a character counter 134a so as to provide a character count field C0–C6 ranging from 0 to 101 as shown in FIG. 11. In the illustrated design, character counts 4 through 83 define the useable character spaces in a scan line or horizontal trace of the CRT beam. Character counts 84 to 101 and 1 to 3 define the horizontal retrace of the beam. The horizontal timing signal set produced by the horizontal timer 134 also includes a horizontal blank (HBL) beginning on character count 83 and extending through character count 3 in the next cycle of the character counter 134a, a horizontal drive (HDR) during character counts 85, 86 and 87, a skip scan length (SSL) signal during character counts 85 through 90 and an end of line (EOL) signal during character count 101, all of which signals are applied to the CRT refresh data bus 45. As the aforementioned horizontal counting functions are well known in the art, any suitable known horizontal timing network as well as timing networks discovered hereinafter may be employed.

A single scan line is defined as one cycle of the character counter 134a as shown in FIG. 11. The EOL signal generated during count 101 is used by a load sequence controller 135 to generate an update unit (UPDU) signal (also shown in FIG. 11) which is utilized to update the basic line counter 123 as well as the unit line counters located in the dual station controllers 200 and 300.

Figure 10:
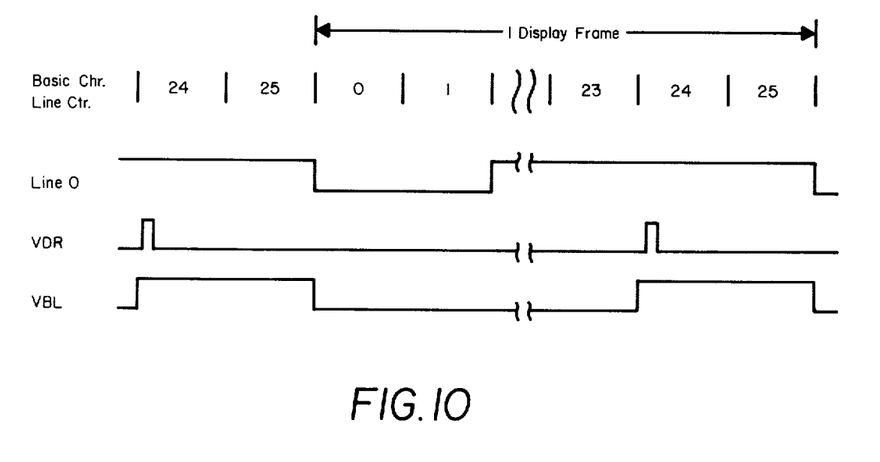
FIG. 10 is a timing diagram illustrating a cycle of the basic line counter of FIG. 6 together with exemplary vertical drive and vertical blank signals.

The basic line counter 123 essentially has two portions. The first portion includes the four lower order stages which produce a scan line field defined by the signals BSL0, BSL1, BSL2 and BSL3. This count field is cycled through 11 counts ranging from 0 to 10 so as to count the number of scan lines in a character line. The second portion includes the five higher order stages which are arranged to count 26 of the scan line sequences ranging from count values 0 to 25 which are manifested by a characterline count field signal set BL0, BL1, BL2, BL3 and BL4. As illustrated in in FIG. 10, 26 counts define one display frame. Counts 0 through 23 are used to define 24 character lines CL0 to CL23. Counts 24 and 25 are used for vertical flyback or retrace as illustrated by the exemplary vertical drive (VDR) and vertical blank (VBL) signal in FIG. 10. Thus, the character line signal set and the scan line signal set define the aforementioned M time periods and N time slots associated with the execution of the frame display programs. Also shown in FIG. 10 is a frame synchronization signal, designated as a Line 0 signal, which is generated once per television raster during counts 0 and 1 by means of a unit line buffer decoder 133 shown in FIG. 6. The Line 0 signal is applied to the CRT bus 45 for use by the dual station controllers to clear the respective unit line counters.

Figure 12:
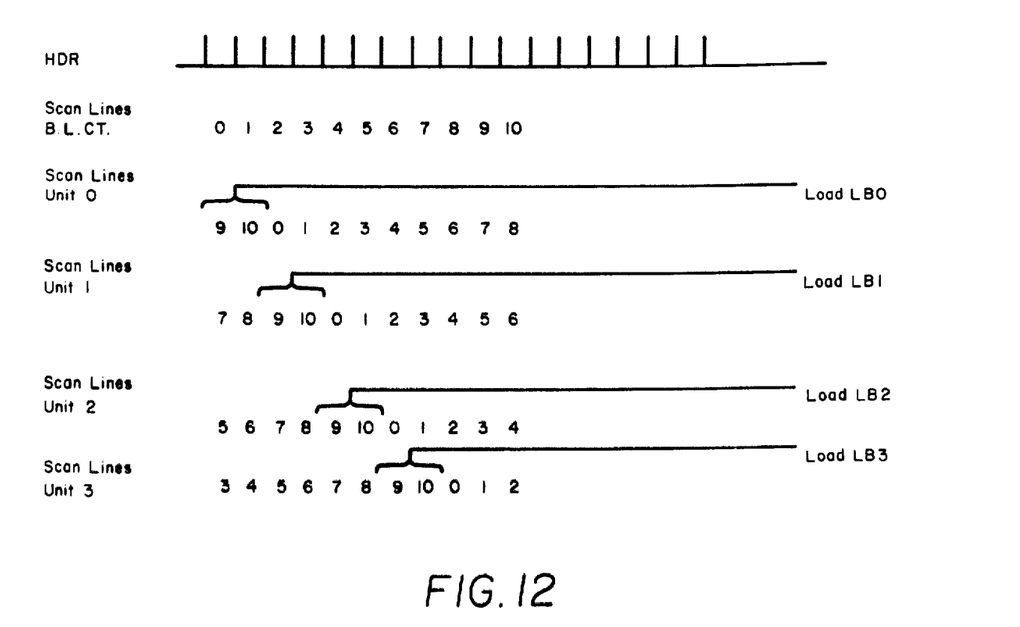
FIG. 12 is a further timing diagram illustrating the sequential execution of the frame display programs as well as the timing relationship between the frame display cycles (television rasters) of the various display units.

In addition to producing the Line 0 signal, the unit line buffer decoder 133 serves to sequentially produce during each character line line buffer select signals U0SL, U1SL, U2SL and U3SL which are applied to the CRT bus 45 and which essentially serve to enable the line buffers for units 0, 1, 2 and 3, respectively, for loading. These unit line buffer signals are produced in coincidence with the execution of the corresponding frame display program. Thus, the unit 0 line buffer line signal U0SL is produced during scan line 0 and 1 of the basic line counter, signal U1SL during scan lines 2 and 3, the signal U2SL during scan lines 4 and 5 and the signal U3SL during scan lines 6 and 7. This relationship is illustrated in FIG. 12 together with the timing relation between the basic line counter and each of the unit line timers or counters. As shown in FIG. 12 the scan line count cycle for unit 0 is delayed from the basic line counter cycle by two scan lines. Scan line cycle for unit 1 is delayed from the unit 0 scan line cycle by two scan lines (one time slot). The unit 2 scan line cycle is delayed from the unit 1 scan line cycle by two scan lines. Finally, the unit 3 scan line count cycle is delayed from that of unit 2 by two scan lines. The character codes for units 0 to 3 are loaded in the corresponding line buffers during scan lines 9 and 10 of the corresponding unit line counters the scan lines 0 to 8 being used for character display.

To illustrate, assume that the basic line counter has just been cleared to its 0 count value indicating character line CL0. During scan lines 0 and 1 of the basic line counter which correspond to scan lines 9 and 10 of count 25 for the unit 0 line counter, the frame display program for unit 0 (LAT0) is executed to retrieve the character codes for character line CL0 of unit 0 and to load such codes into the corresponding unit 0 line buffer. During the next two scan lines 2 and 3, of the basic line counter corresponding to scan lines 9 and 10 of count value 25 for the unit 1 line counter, the frame display program for unit 1 (LAT1) is executed to retrieve character codes for line CL0 of unit 1 and to load such codes into the unit 1 line buffer. The frame display programs for units 2 and 3 (LAT 2 and LAT 3) are then executed during scan lines 9 and 10 of their respective unit line counters which correspond to scan lines 4 and 5 and 6 and 7 respectively of the basic line counter. This sequence of operation is then repeated for each of the character lines CL1 to CL23.

Figure 9:
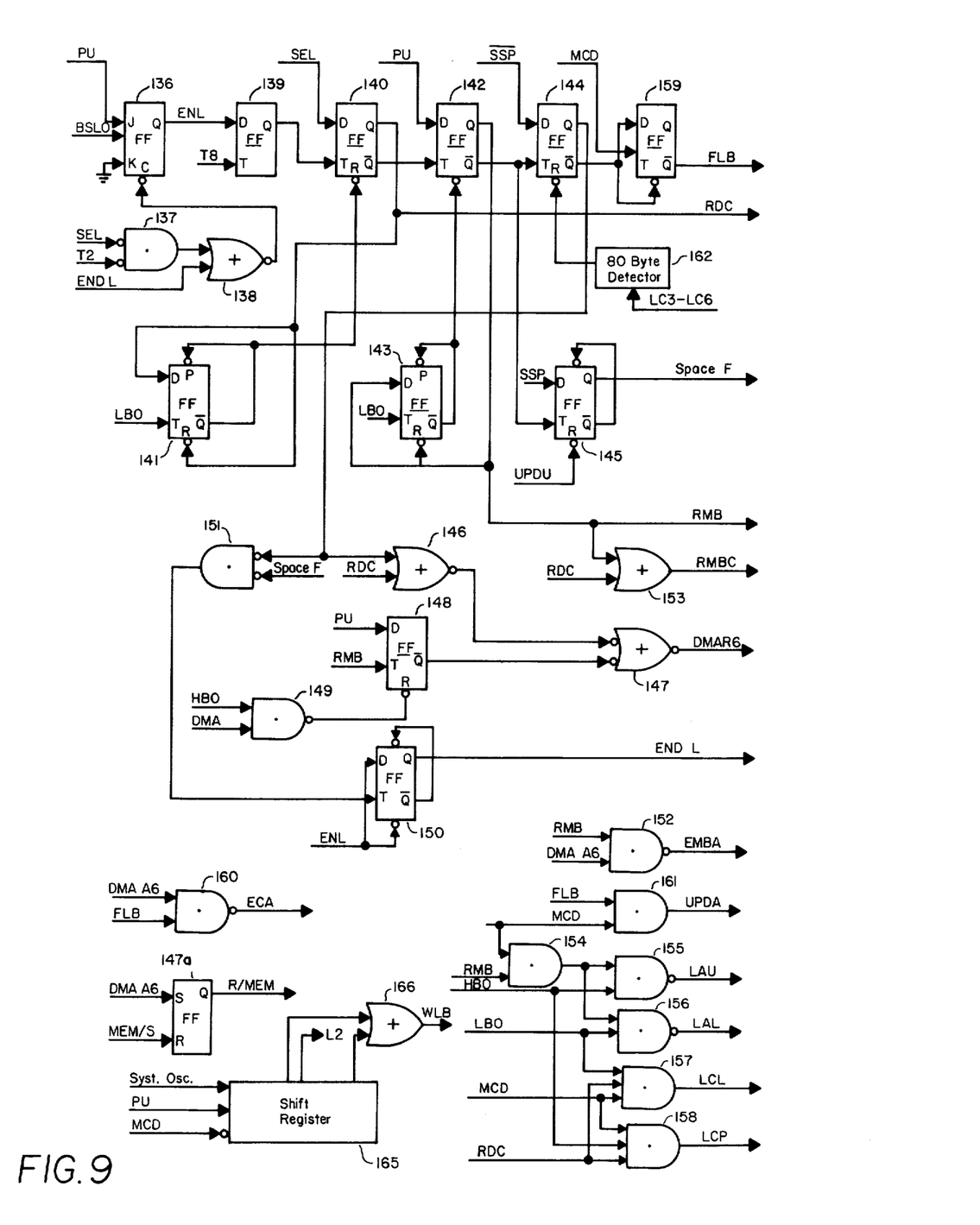
FIG. 9 is a block diagram of the load sequence controller of the FIG. 6 block diagram.

In executing a frame display program, the refresh control unit 120 performs three major operations sequentially. First, it reads the cursor information from the LAT entry 24. Second, it reads one of the corresponding LAT entries 0–23 hereinafter referred to as the mailbox. Third, it then either reads the specified memory block and fills the corresponding line buffer or simply produces a space fill signal and terminates the program in the case of a blank line. For the read cursor and read mailbox operations, the refresh control unit uses a LAT address multiplexer (MUX) 125 to perform two memory read operations so as to fetch two bytes of curor or mailbox information. In the read memory block operation, it performs 80 memory read operations, a cursor compare for each and a unit line buffer fill operation. All of these operations proceed under the control of a load sequence controller 135 which is shown in detail in FIG. 9. In FIG. 9 as well as elsewhere in the drawing, a source of binary ones has been illustrated by means of a pullup (PU) signal. A source of binary 0 has been illustrated simply by means of a circuit ground connection. For example, flip-flop 136 has a source of ones connected to its J input and a source of 0 connected to its K input.

The load sequence controller is enabled at the start of the basic line counter scan line counts 0, 2, 4 and 6 by means of a select (SEL) signal which is returned via the CRT bus 45 by the corresponding dual station controller in response to the corresponding unit select signals U0SL-U3SL. An initializing circuit including J-K flip-flop 136 and gates 137 and 138 are arranged to respond to the SEL signal and to an end of load (ENDL) signal to produce an enable (ENL) signal. For example, at the start of basic scan line count 0 the BSL0 bit clocks the flip-flop 136 so that its Q output (the ENL signal) goes high to follow its J input. The gate 137 is arranged to sense an inactive condition of the SEL signal to clear the flip-flop 136. The inactive condition of the SEL signal can only occur if the selected unit is either nonexistent or in its vertical retrace mode. The ENDL signal is also coupled via b gate 138 to clear flip-flop 136 when the load operation has been completed.

The ENL signal is clocked through a flip-flop 139 on the next succeeding T8 dot signal. This causes the Q output of flip-flop 139 to go high and trigger a load cursor flip-flop 140 which has its D input enabled by the SEL signal. The Q output of load cursor flip-flop 140 produces a read cursor (RDC) signal.

The RDC signal is sensed by NOR gates 146 and 147 to produce a (DMA) request six (DMAR6) signal which is sent to the DMA control unit 103 (FIG. 1) via the system bus 44. When priority has been established for the refresh control unit, the DMA control unit returns a DMA acknowledge 6 (DMAA6) signal via the system bus 44. A flip-flop 147a is set by the DMAA6 signal to produce a read memory (R/MEM) signal which is applied to the memory 30 via the system bus 44. The memory 30 responds to the R/MEM signal and to accompanying address signals to produce a memory select (MEM/S) signal which resets the flip-flop 147a. This DMA request and acknowledge procedure is repeated for each memory read operation.

The LAT address MUX 125 responds to the R/MEM signal and the RDC signal to place on the system bus 44 a memory address formed of four components. Two of the components are provided by a LATO starting address pointer 121 and a cursor address pointer 122. A third component consists of the basic line counter scan line bits, BSL1 and BSL2, and the fourth component consists of an output HBO of an odd-even O/E flip-flop 124. The LATO pointer and the cursor address pointer each essentially consist of a fixed or constant field of bits which may be derived from sources of 1's and 0's such as a fixed or constant voltage level and circuit ground. The LATO pointer points to the starting address of LATO while the scan line bits BSL1 and BSL2 select one of the four frame display programs. The cursor address pointer then points to the cursor entry at position 24 within the selected frame display program. The HBO bit output of O/E flip-flop 124 indicates which of two consecutive storage locations containing the cursor information is to be read. The O/E flip-flop is enabled by a read cursor or read mailbox (RMBC) signal only for operation during the read cursor and read mailbox operations. The RMBC signal is produced by OR gate 153 (FIG. 9) which senses the RDC and RMB(read mailbox) signals.

The first byte of cursor information is then read from the memory and transferred to bus 44 together with a memory cycle done (MCD) signal. The O/E flip-flop 124 toggles in response to the MCD signal so that its HBO output now indicates the memory address of the second byte of cursor information. The load sequence controller also responds to this MCD signal to issue an LCL signal which serves to load the first byte of cursor information into a cursor register 127. The second byte of cursor information is read from the memory (when DMA control is regained) and loaded into the cursor register 127 under control of an LCP signal generated in response to the MCD signal which accompanies the second cursor byte on the system bus 44. The LCL and LCP signals are produced (see FIG. 9) by means of gates 157 and 158 which are both conditioned by the RDC and MCD signals. Gate 157 produces the LCL signal by additionally sensing the LBO output of the O/E flip-flop. Gate 158 produces the LCP signal by additionally sensing the HBO output of the O/E flip-flop.

The second MCD signal toggles the O/E flip-flop preparing it for the read mailbox operation. The toggling of the O/E flip-flop (its LBO output) is sensed by a flip-flop 141 which responds thereto to clear the read cursor flip-flop 140. This causes a read mailbox flip-flop 142 to change state and produce a read mailbox (RMB) signal. The RMB signal clocks a flip-flop 148 so as to cause another DMA request via gate 147. The resulting DMAA6 is combined with the RMB signal by NAND gate 152 to produce an enable mail box (EMBA) signal.

The LAT address pointer 125 responds to the R/MEM signal and the EMBA signal to place on the system bus 44 an address formed by the LATO starting address pointer 21, the five character line bits BL0 to BL4 and the two scan line bits BSL1 and BSL2 of the basic line counter together with the HB0 output of the O/E flip-flop 124. The BL0 to BL4 character line field replaces the cursor address pointer field so as to point to a specific entry within the selected LAT frame display program. The addressed LAT entry is read from the memory on two successive memory cycles by means of toggling the O/E flip-flop as in the read cursor operation. The LAT entry so fetched is loaded into a character codes address counter 126, one byte at a time under the control of an LAU signal and an LAL signal. These signals are produced (see FIG. 9) by means of gates 154, 155 and 156. Gate 154 senses the occurrence of the MCD signal during the RMB signal (the read mailbox operation). The output of gate 154 is combined with the HB0 and LB0 outputs of the O/E flip-flop in gates 155 and 156 to produce the LAU and LAL signals, respectively, noting that the O/E flip-flop is also toggled by the MCD signal. When the O/E flip-flop is toggled by the second MCD signal during the read mail box operation, a flip-flop 143 (FIG. 9), is switched by the LBO signal. This causes the read mailbox flip-flop 142 to clear and thus terminate the RMB and RMBC signals. This switching of the read mailbox flip-flop 142 causes either a read character codes flip-flop 144 or a space fill flip-flop 145 to switch dependent upon the value of the most significant bit SSP of the second byte of the LAT entry. If the SSP bit is active (binary 1) signifying a blank character line, the flip-flop 145 switches to provide a space fill (SPACE F) signal to the appropriate dual station controller via the CRT data bus 45 as well as to an end load flip-flop 150 via gate 151. Flip-flop 150 switches to provide an end load (ENDL) signal which serves to terminate execution of the LAT program by clearing flip-flop 136. The flip-flop 145 is reset by the UPDU signal.

To continue execution of the frame display program for the case where the currently addressed character line is not blank (SSP is a 0) the read character codes flip-flop 144 switches when the read mailbox flip-flop 142 changes state signifying the end of the read mailbox operation. As this occurs at the end of the second read mailbox memory cycle, the MCD signal occurring at this time also causes flip-flop 159 to switch and produce a fill line buffer (FLB) signal. The Q output of the read character codes flip-flop 144 is sensed by gates 146 and 147 so as to produce the DMAR6 signal which will remain active until 80 memory read operations have been performed to retrieve the 80 character codes for the current character line.

For the execution of this portion of the LAT program, the character codes address counter 126 is employed to provide memory addresses for the memory 30. The character codes address counter is enabled at the start of each memory read operation by an enable CRT address (ECA) signal provided by a NAND gate 160 (FIG. 9). The NAND gate 160 is enabled by the FLB signal and produces the ECA signal upon the occurrence of the DMAA6 signal at the time the memory control is granted to the refresh control unit to start each memory read operation.

The LAT entry which was loaded in the address counter 126 during the read mailbox operation points to the first code in the memory block for the current line. As each code is retrieved, the counter 126 is updated by an update address (UPDA) signal produced by gate 161 (FIG. 9) at the end of each memory cycle. Thus gate 161 is enabled by the FLB signal to produce the MCA signal in response to each MCD signal during the read character codes operation.

As each character code is placed on the bus 44 by memory 30, the accompanying MCD signal acts to load it into a CRT data register 128. Either the character code in the register 128 or a code provided by a cursor code generator 130 is then placed on the CRT refresh bus 45 under the control of a multiplexer (MUX) 131. The MUX 131 is controlled by the output of a cursor comparator 129 which normally selects the character code for all locations in a frame of character codes except for one character location where the cursor is positioned. The cursor character code generator 130 may be any suitable fixed bit pattern generator to produce a code for the display of a selected cursor mark.

As each code is retrieved from memory 30 and loaded into the CRT data register 128, cursor comparator 129 compares the contents of the cursor register 127 with the character line field BL0-BL4 of the basic line counter and horizontal position field LC0-LC6 provided by a line buffer loader 132 comprised of the line buffer load counter 132a and an output line buffer loader register 132b. The counter 132a is cleared by the RDC signal during the portion of the frame display program in which the cursor is retrieved from the memory. At the end of the memory cycle during which the cursor information is retrieved, the MCD signal enters the output of the load counter 132a into the load register 132b. At this point in time the contents of register 132b signify the first character position in a character line. At the start of the memory cycle in which the first character code is retrieved, the load counter 132a is updated by the ECA signal so that its contents signify the second character position in the line, but the contents of the line buffer load register 132b still signify the first character position. Thus, as the first code is entered into the data register 128, the cursor comparator 129 compares the first character position signified by load register 132b and the character line field BL0-BL4 with the cursor character line and horizontal position information contained in the cursor register 127. At the end of this memory cycle, the MCD signal loads the second horizontal character position value from counter 132a into the register 132b for use when the next code is retrieved from memory. The horizontal character position field LC0-LC6 is also provided to the dual station controllers on the bus 45 for use as a line buffer load address by the dual station controller.

In the illustrated design the unit line buffers can only store four bits in each addressable storage location. For this reason the CRT character codes are placed on the CRT data bus 45 in two four bit bytes under the control of a signal L2. The signal L2 is shown in FIG. 9 to be produced by an eight stage shift register employing as a shift signal source the system oscillator. The system oscillator which is employed for the CPU 101, (FIG. 1) has a high enough frequency to produce at least eight pulses before the next MCD signal. The character code is loaded into the CRT data register 128 on the leading edge of the MCD signal. During the first four shift pulses the L2 signal is low and during the last four shift pulses the L2 signal is high. An OR gate 166 senses the outputs of the third and fourth stages and seventh and eighth stages in order to provide a write line buffer (WLB) signal which is the actual write signal to the line buffers in the dual station controller. The WLB signal is routed to all of the dual station controllers but is gated with the unit select signal (e.g., U0SL) so that only the currently selected unit can use the WLB signal. The WLB signal essentially indicates that the CRT data on the CRT bus 45 is stable and ready to be written into the selected line buffer.

When the output of the line buffer loader 132 signifies that the 80th character code has been loaded into the data register 128, an 80 byte detector 162 detects the count of 80 by means of its input LC3-LC6 and provide a clear or reset signal to the read character codes flip-flop 144. This causes flip-flop 144 to switch and a number of other events to occur. First, gate 146 and gate 147 act to terminate the DMAR6 signal. Second, gate 151 acts to clock flip-flop 150 and produce the ENDL signal. The ENDL signal in turn acts via gate 138 to clear the load sequence enable flip-flop 136. Third, the switching of flip-flop 144 causes the flip-flop 159 to switch on the trailing edge of the MCD signal for the 80th character code and thus terminate the FLB signal.

To summarize, the refresh control unit 120 uses the count fields provided by the basic line counter 123 to execute the frame display programs LAT0-LAT3 sequentially during M consecutive time periods (time slots) to retrieve from the memory 30 the character codes in proper order for each of the display units and to select the corresponding line buffer for loading of such character codes. As each program is executed, the refresh control unit provides on the CRT bus the corresponding line buffer select signal U0SL-U3SL, the character codes in sequence and, in coincidence therewith, the line buffer load address field LC0-LC6 together with a number of other control signals. If the LAT entry indicates that the character line is blank, the refresh control unit places the SPACE F signal on the CRT bus and terminates execution of the program instructions so as to allow other units in the display system to use the memory. The horizontal timer 134 provides the necessary horizontal timing information to the CRT bus for horizontal control of all of the CRT units.

Dual Station Controller

Figure 7:
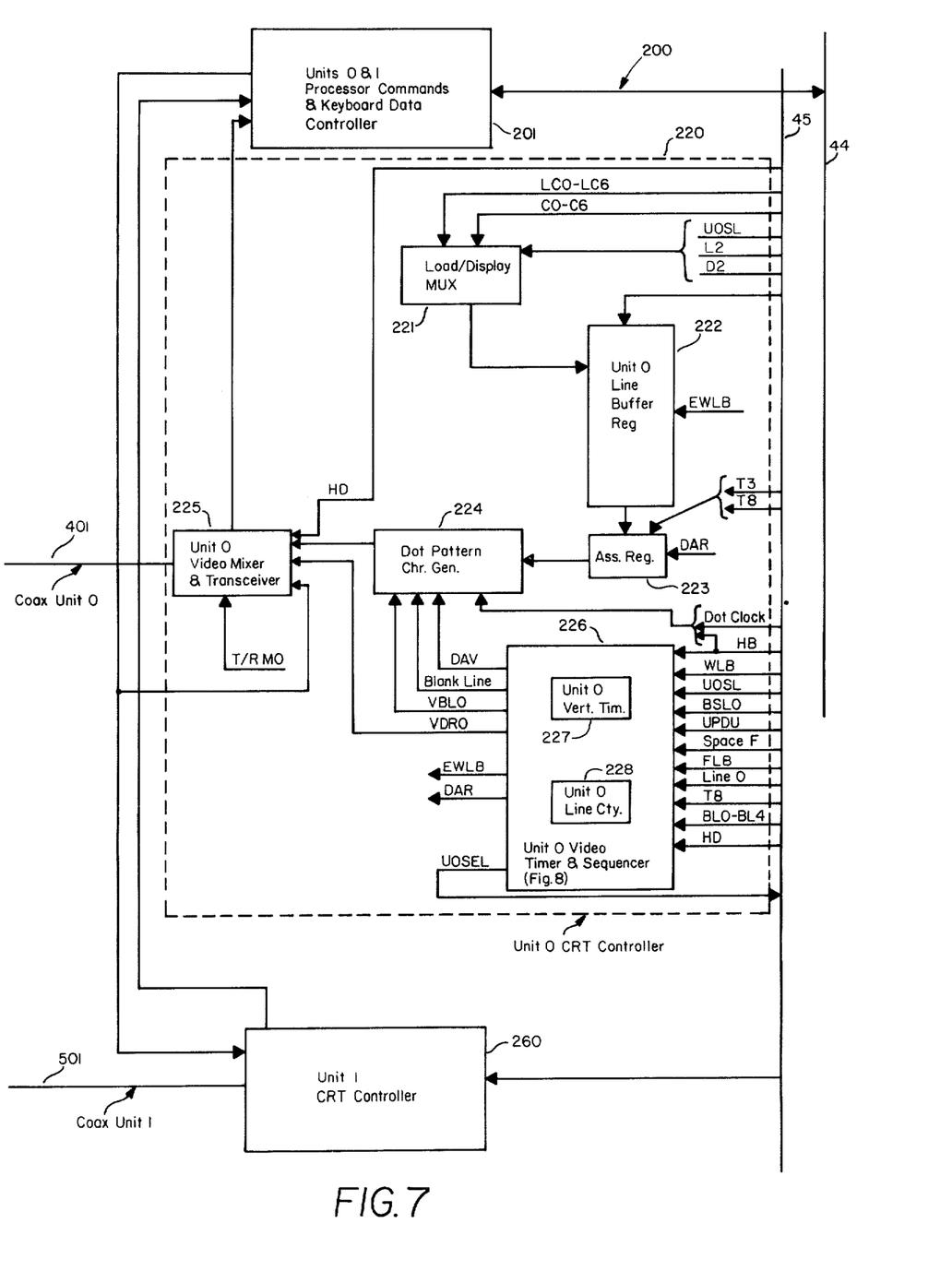
FIG. 7 is a block diagram of a dual station controller of the FIG. 5 diagram.

Referring now to FIG. 7, the dual station controller 200 for display units 0 and 1 will now be described in detail, there being no need to also describe the dual station controller 300 as it is substantially identical to the controller 200. Dual station controller 200 includes a unit 0 CRT controller 220, a unit 1 CRT controller 260 and a unit 0 and 1 processor commands and keyboard data controller 201. As the controllers 220 and 260 are substantially identical, only the unit 0 CRT controller 220 will be described in detail.

The unit 0 CRT controller 220 includes a unit 0 line buffer 222, a load/display MUX 221, a unit 0 video timer and sequencer 226, an assembly register 223, a dot pattern character generator 224 and a unit 0 video mixer and transceiver 225. The load/display MUX 221 multiplexes either the load line buffer address (LC0-LC6) or the display line buffer address (C0-C6) to the unit 0 line buffer dependent upon the value of the U0SL signal. When the U0SL signal is active signifying the execution of the frame display program for unit 0, the MUX 221 applies the load line buffer address LC0-LC6 to the line buffer. On the other hand, when the signal U0SL is inactive, the MUX 221 applies the display address C0-C6 to the unit 0 line buffer. The L2 and D2 signals from the CRT bus 45 are used as the least significant bits in the load line buffer address and the display line buffer address, respectively, so as to write or read two 4 bit consecutive bytes of a CRT character code into or from the line buffer 222.

The line buffer 222 is enabled for a read or a write operation in accordance with the value of an enable write line buffer (EWLB) signal produced by b gate 235 (FIG. 8) included in the unit 0 video timer sequencer 226 upon coincidence of the U0SL signal and the WLB signal on the CRT bus 45. The EWIB signal can be active, signifying a load operation only during scan lines 0 and 1 of the basic line counter (corresponding to scan lines 9 and 10 of the unit 0 line counter 228 as illustrated in FIG. 12) and is inactive signifying read operations at all other times. During scan lines 9 and 10 of unit 0, the WLB signal and the EWLB signal go active twice during each of the 80 character load times signified by the load buffer field LC0-LC6, once to write the first 4 bit byte of CRT data and once to write the second 4 bit byte of CRT data in consecutive line buffer storage locations in accordance with the L2 bit.

For the read operation, the EWLB signal is inactive to allow the unit 0 line buffer 222 to be read at all times during unit 0 scan lines 0 to 8. During each scan line, the field C0-C6 (from the horizontal character counter 132b in FIG. 6) is used together with bit D2 to address all 80 character codes. The bit D2 changes value once per horizontal character time so as to allow the reading of two 4 bit bytes of character code per character time. As each code is read, it is loaded into the assembly register 223 and made available to the character generator 224 during the next character time as explained below.

With reference again to FIG. 8, the unit 0 video timer and sequencer 226 includes a unit 0 vertical timer 227 and the unit 0 line counter 228. The unit 0 line counter is arranged to operate in synchronization with the basic line counter 123 (FIG. 6) but delayed therefrom by two scan line durations as illustrated in FIG. 12. This delay is achieved by means of a unit 0 frame synchronization circuit including a flip-flop 229 which is arranged to respond to the U0SL signal, the complement $\overline{BSLO}$ signal and the T8 dot pulse from the horizontal timer to produce at its Q output an active signal which is ANDED with the Line 0 signal to produce a unit 0 line counter clear (U0LCC) signal which is operative to clear the unit 0 line counter 228 at the start of scan line 2 of character line 0 of the basic line counter. The unit 0 line counter is updated by the UPDU signal which is also used to update the basic line counter 123 (FIG. 6).

The unit 0 vertical timer 227 is responsive to the horizontal drive HD signal from horizontal timer 134, the basic line counter character field BL0-BL4 and the U0LCC signal to produce for unit 0 a vertical blank (VBL0) signal and a vertical drive (VDR0) signal for the unit 0 television raster. The VDR0 signal occurs during count value 24 of the basic line counter and of the unit 0 line counter (see FIG. 10). The VBL0 signal is active during count values 24 and 25 of the unit 0 line counter. The VBL0 signal is essentially delayed from the exemplary VBL signal as shown in FIG. 10 by two scan line durations.

Referring again to FIG. 7, the first character code is read from the unit 0 line buffer 222 during character count value or character time 0 but is not actually displayed by unit 0 until character time 4 due to delays in the assembly register 223, the character generator and video control 224 and the video mixer and transceiver 225. This delay is illustrated in FIG. 11 which shows the horizontal blank HBL signal becoming active at the start of character time 84 and extending through character time 3 in the next scan line.

To continue with the reading operation of the unit 0 line buffer, two read cycles are required to read two bytes of each character code in synchronism with the D2 signal as mentioned above. These two bytes are entered into the assembly register 223 at T3 and T8 dot times during character time 0 and made available to the character generator 224 at dot time T0 of character time 1. The character generator 224 responds to the incoming character code, dot signal sequences and the horizontal blank HB signal to produce a CRT blank and unblank signal which is intensity coded at selected dot times in patterns determined by the character codes. As the character generator 224 does not form a part of this invention and since such character generators are well known in the art, there is no need to describe it in detail herein.

Figure 8:
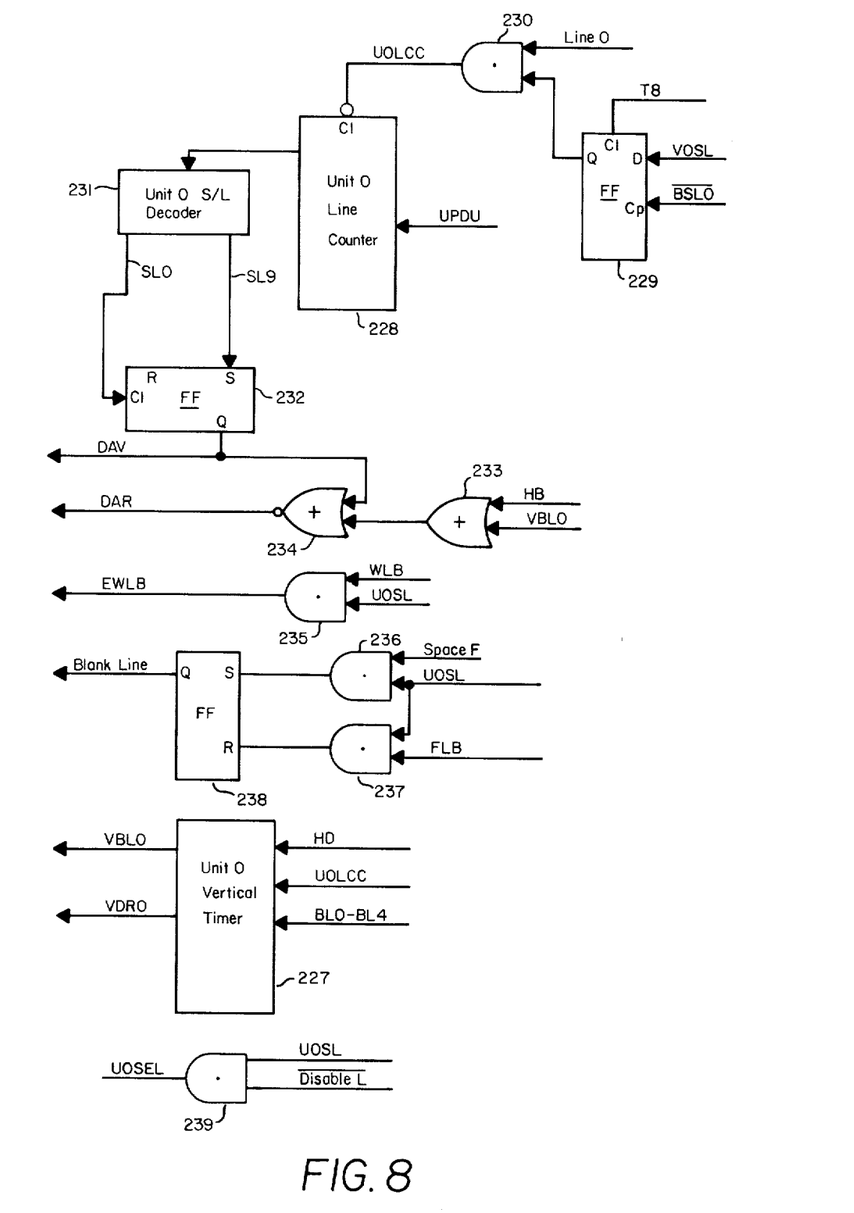
FIG. 8 is a block diagram of a video timer and sequencer for the FIG. 7 block diagram.

Since the line buffer outputs are invalid during load time, character generator 224 is disabled by a disable video (DAV) signal at the end of scan line 9 for each character line. The DAV signal is shown at FIG. 8 to be produced by means of a flip-flop 232 which is responsive to the decoded outputs of a unit 0 scan line decoder 231. Flip-flop 232 is set for the detection of scan line 9 and cleared on the detection of scan line 0.

The assembly register 223 is disabled by a disable assembly register (DAR) signal both between character lines and horizontal retrace as well as vertical retrace for unit 0. The DAR signal is shown in FIG. 8 to be simply generated by OR gates 233 and 234 which operate upon the HB signal, the VBL0 signal and the DAV signal.

The character generator 224 also responds to a blank line signal provided by the video timer sequencer 226 so as to essentially become disabled and provide a continuous blank signal for the entire duration of the scan line. As shown in FIG. 8, the blank line signal is produced by a flip-flop 238 which is set in response to the Space F signal and reset upon the occurrence of the FLB signal provided that the U0SL signal is active. To this end, AND gates 236 and 237 are provided to enable the Space F and FLB signals to set the reset flip-flop 238. Also shown in FIG. 8 is an AND gate 239 which produces the unit 0 select (U0SEL) signal upon the coincidence of the U0SL signal and the absence of the disable L which is signified by the complement Disable L signal. The U0SEL signal corresponds to the SEL signal which serves to enable the load sequence controller 135 in FIG. 6. The Disable L signal is generated by a flip-flop (not shown) which is set at the start of the VBL0 signal and is reset at the start of character count 25 for unit 0 and serves to prevent unnecessary load cycles from wasting memory time. The blank/unblank intensity encoded signal output of the character generator is mixed in the unit 0 video mixer and transceiver 225 with the horizontal drive HB signal, the vertical drive VDR0 signal and the scan line length signal to produce a composite video signal. The composite video signal is transmitted over coaxial cable 401 to unit 0. The vertical retrace time of the composite video signal is used for (1) transmission of commands from the CPU 101 (FIG. 1) to keyboard unit 0 and for (2) transmission from the keyboard to the CPU of keyboard status information and keyboard data. Vertical retrace time corresponds to character line time or count values 24 and 25 of the unit 0 line counter which is delayed by two scan line durations from character times 24 and 25 of the basic line counter (see FIG. 10). Thus, a transmit/receive mode 0 (T/RM0) signal enables the unit 0 video mixer and transceiver to transmit the composite video signal during character line times 0 to 23. During character line times 24 and 25 the T/RM0 signal first enables the transceiver 225 to transmit to unit 0 the commands received from the CPU via the system bus 44 and the units 0 and 1 processor commands and keyboard data controller 201. Secondly, the T/RM0 signal enables the transceiver 225 to receive from unit 0 status and/or data information. The information so received is supplied to the units 0 and 1 processor commands and keyboard data controller 201 which in turn supplies such information to the CPU over the system bus 44 by means of the aforementioned interrupt procedure. As the details of the unit 0 and 1 processor commands and keyboard data controller 201 are not germane to an understanding of the present invention, they will not be described herein.

There has been described an improved electronic display system in which a single memory is timeshared by a plurality of display units. Blocks of memory codes corresponding to character lines are stored anywhere throughout the memory together with a frame display program for each display unit specifying the order in which the blocks of characters are to appear on the display surface. A basic line counter is employed to execute the frame display programs sequentially in time so as to retrive the character codes, a block at a time, and to load them into selected unit line buffers. It should be apparent that the particular display system design shown throughout the drawing is for illustration purposes only and that other designs may be employed. For example, it is contemplated that the timesharing principles of the invention are applicable from two up to N display units, the number N being limited only by the amount of time required to execute the frame display programs in retrieving character codes from the memory and loading them into the corresponding line buffer. That is, the N instruction execution time slot could be less than two scan line durations subject only to the speed with which the circuits can execute the frame display program. Furthermore, it should be apparent to those skilled in the art that the electronic display system described herein can be programmable so as to have a number of different modes. For example, a different size of character display can be achieved by simply lowering the dot frequency and lengthening the time between updates of the unit line counter at the dual station controller. In one design employing this technique, the dot frequency is divided by two so as to make the dots twice as wide and the update UPDU signal is divided by two. This causes the character to be twice as high with dots that are twice as wide.

Thus, while a preferred embodiment of the invention is shown in the drawings, it is to be understood that this disclosure is for the purposes of illustration only and that various changes in shape, proportion and arrangement of parts as well as the substitution of equivalent elements for those herein shown and described may be made without departing from the spirit and scope of the invention set forth in the appended claims.

I claim:

1. In display apparatus for N display units, N being an integer greater than one, each display unit having a television monitor responsive to a television signal to display a frame of characters in the form of M lines of characters, M being an integer, the signal being characterized by a periodic television raster defined by horizontal and vertical timing signals produced by a source of timing signals, the raster being adapted for encoding with a frame of character codes corresponding to and manifesting said frame of characters; each unit further including a unit line buffer for storing said frame of codes, a line at a time, means for reading the codes from said buffer, and means for combining the raster timing signals with the codes so read to produce said television signal; said display apparatus comprising:

memory means for storing for each display unit
  (a) the associated frame of character codes in the form of M blocks of codes in any order of block storage locations therein, each block having a starting address and the codes in each block manifesting a line of characters, and
  (b) a frame display program including M instructions corresponding to the M blocks, each instruction specifying the starting address of the associated block of codes,
 instruction execution means including
  (a) basic counting means responsive to the horizontal timing signals for generating a set of character line signals defining M time periods and a further set of signals defining a group of horizontal timing signals occurring within each of the M time periods;
  (b) first control means utilizing the character line signal set and the further signal set to process N instructions in N sequentially occurring time slots during each character line time period, one from each program, to retrieve from memory during each such period the N blocks of codes associated with said N instructions; and
  (c) second control means responsive to said signal sets to load the N blocks of codes into the corresponding N unit line buffers during each such period so that each program has one of its M instructions executed during each of the M time periods in each television frame.

2. Display apparatus as set forth in claim 1 wherein said horizontal and vertical timing signals include (a) one set of horizontal timing signals produced by a horizontal signal timer and (b) N sets of vertical timing signals produced by N vertical timers, one for each display unit, the corresponding television raster being defined by the horizontal signal set and the associated vertical signal set;

wherein the basic counting means produces a frame synchronization signal once per television raster and a set of basic vertical timing signals; and
 wherein each of said display units includes raster synchronization means responsive to said frame synchronization signal and to the further set of signals to operate its associated vertical timer to produce its associated vertical timing signal set offset in time by at least one of the time slots from the vertical timing signal set of any of the other units and of the basic counting means.

3. Display apparatus as set forth in claim 1
 wherein said instruction execution means executes at least 2 N instructions during each said time period, said 2 N instructions including at least two instructions of each display program;
 wherein each display program has at least one further instruction specifying the vertical and horizontal position of a cursor marker; and wherein said at least two instructions include the cursor instruction and one of the M instructions.

4. Display apparatus as set forth in claim 3 wherein the character line signal set is manifested by a character line count field having M values per television raster and the further signal set is manifested by a scan line count field having P values for each character line count value, P being an integer; wherein said first control means includes a source of cursor address field;

a cursor instruction register;

a memory block address counter;

a display program address multiplexer; and means active during each of the time periods in response to at least one signal of the further signal set to perform the following operations for each display program: operate the display program address multiplexer first to use the cursor address field and the scan line count field to retrieve from the memory the cursor instruction of the associated frame display program and load it into the cursor register and next to use the character line and scan line count fields to retrieve from the memory one of the M instructions of the associated frame display program and to load it into the memory block address counter;

wherein said second control means includes a unit line buffer decoder responsive to the scan line count field to select for loading the unit line buffer corresponding to the associated display program; and means responsive to the completion of the loading of the memory block address counter with one of the M instructions for executing said one instruction.

5. Display apparatus as set forth in claim 4 wherein the first and second control means are responsive to the execution of said one instruction to retrieve from the memory the line of character codes designated by such one instruction and to load such retrieved codes into the selected unit line buffer.

6. Display apparatus as set forth in claim 5 wherein said means for executing said one instruction further includes means for detecting from said one instruction a blank line condition and upon such detection disabling said retrieving and loading by the first and second control means and signalling the selected display unit that a blank line is to be displayed.

7. Display apparatus as set forth in claim 6 wherein the second control means includes line loader means for producing a line buffer load field;

means for updating the memory block address counter and the line buffer loader means as each of the codes is read from the associated memory block;

a character code register for storing each said code as it is read from memory;

means for transferring the line buffer load field and the character codes to the selected unit line buffer.

8. Display apparatus as set forth in claim 1 wherein the first control means further includes a cursor comparator for comparing the contents of the cursor register with the character line field and the line buffer load field and upon a match producing a cursor signal; and wherein the means for transferring includes means responsive to said cursor signal for transferring a cursor code to the selected unit line buffer.

* * * * *